United States Patent
Umesh et al.

(10) Patent No.: US 7,941,168 B2
(45) Date of Patent: May 10, 2011

(54) MOBILE COMMUNICATION SYSTEM, RADIO BASE STATION, MOBILE STATION AND MOBILE COMMUNICATION METHOD TO CONTROL UPLINK AND DOWNLINK CHANNEL FOR SYNCHRONIZATION

(75) Inventors: Anil Umesh, Yokohama (JP); Masafumi Usuda, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 901 days.

(21) Appl. No.: 11/344,158

(22) Filed: Feb. 1, 2006

(65) Prior Publication Data

US 2006/0193275 A1  Aug. 31, 2006

(30) Foreign Application Priority Data

Feb. 2, 2005 (JP) ................................ P2005-027102

(51) Int. Cl.
*H04B 7/005* (2006.01)
(52) U.S. Cl. ...................... 455/502; 455/511; 455/422.1
(58) Field of Classification Search .................. 370/100, 370/514–516, 329, 350; 455/69, 502, 464, 455/498, 503, 510, 511
See application file for complete search history.

(56) References Cited

U.S. PATENT DOCUMENTS

| 5,745,496 A * | 4/1998 | Lysejko | 370/515 |
| 5,809,093 A * | 9/1998 | Cooper | 375/365 |
| 2003/0063620 A1 * | 4/2003 | You et al. | 370/444 |
| 2003/0219037 A1 * | 11/2003 | Toskala et al. | 370/496 |
| 2005/0068990 A1 * | 3/2005 | Liu | 370/516 |

FOREIGN PATENT DOCUMENTS

WO   WO 2004/049648 A2   10/2004

OTHER PUBLICATIONS

Search Report issued on May 10, 2006 in the counterpart European application No. 06002126.8-2416.
3GPP TS25.308 v6.3.0; 3rd Generation Partnership Project; Technical specification Group Radio Access Network; High Speed Downlink Packet Access (HSDPA); Overall description, Dec. 2004.
3GPP TS25.211 v6.3.0; 3rd Generation Partnership Project; Technical Specification Group Radio Access Network; Physical channels and mapping of transport channels onto . . . , Dec. 2004.
3GPP TS25.212 v6.3.0; 3rd Generation Partnership Project; Technical Specificaiton Group Radio Access Network; Multiplexing and channel coding (FDD), Dec. 2004.
3GPP TS25.213 v6.1.0; 3rd Generation Partnership Project; Technical Specificaiton Group Radio Access Network; Spreading and modulation (FDD), Dec. 2004.

(Continued)

*Primary Examiner* — Nghi H Ly
*Assistant Examiner* — Myron Wyche
(74) *Attorney, Agent, or Firm* — Marvin A. Motsenbocker; Mots Law, PLLC

(57) ABSTRACT

A mobile communication system is configured to control a transmission rate of user data to be transmitted from a mobile station to a radio base station via an uplink transmission rate allocation shared physical control channel, and to transmit user data from the radio base station to the mobile station via a downlink shared physical data channel. Transmission frame timing of the uplink transmission rate allocation shared physical control channel is synchronized with transmission frame timing of the downlink shared physical data channel.

8 Claims, 9 Drawing Sheets

OTHER PUBLICATIONS

3GPP TS25.214 v6.4.0; 3rd Generation Partnership Project; Technical Specificaiton Group Radio Access Network; Physical layer procedures (FDD), Dec. 2004.

3GPP TS25.309 v6.1.0; 3rd Generation Partnership Project; Technical Specificaiton Group Radio Access Network; FDD Enhanced Uplink; Overall description; Stage 2, Dec. 2004.

3GPP TSG R1-050145; TSG-RAN Working GOurp 1 #40 meeting; E-AGCH timing; 9.2 FDD Enhanced upling- Timing, HARQ and scheduling, Feb. 2005.

3GPP TS25.211 v6.6.0; 3GPP TSG R1-050145; 3rd Generation Partnership Project; Technical Specificaiton Group Radio Access Network;Phycical channels and mapping of transport . . . , Sep. 2005.

* cited by examiner

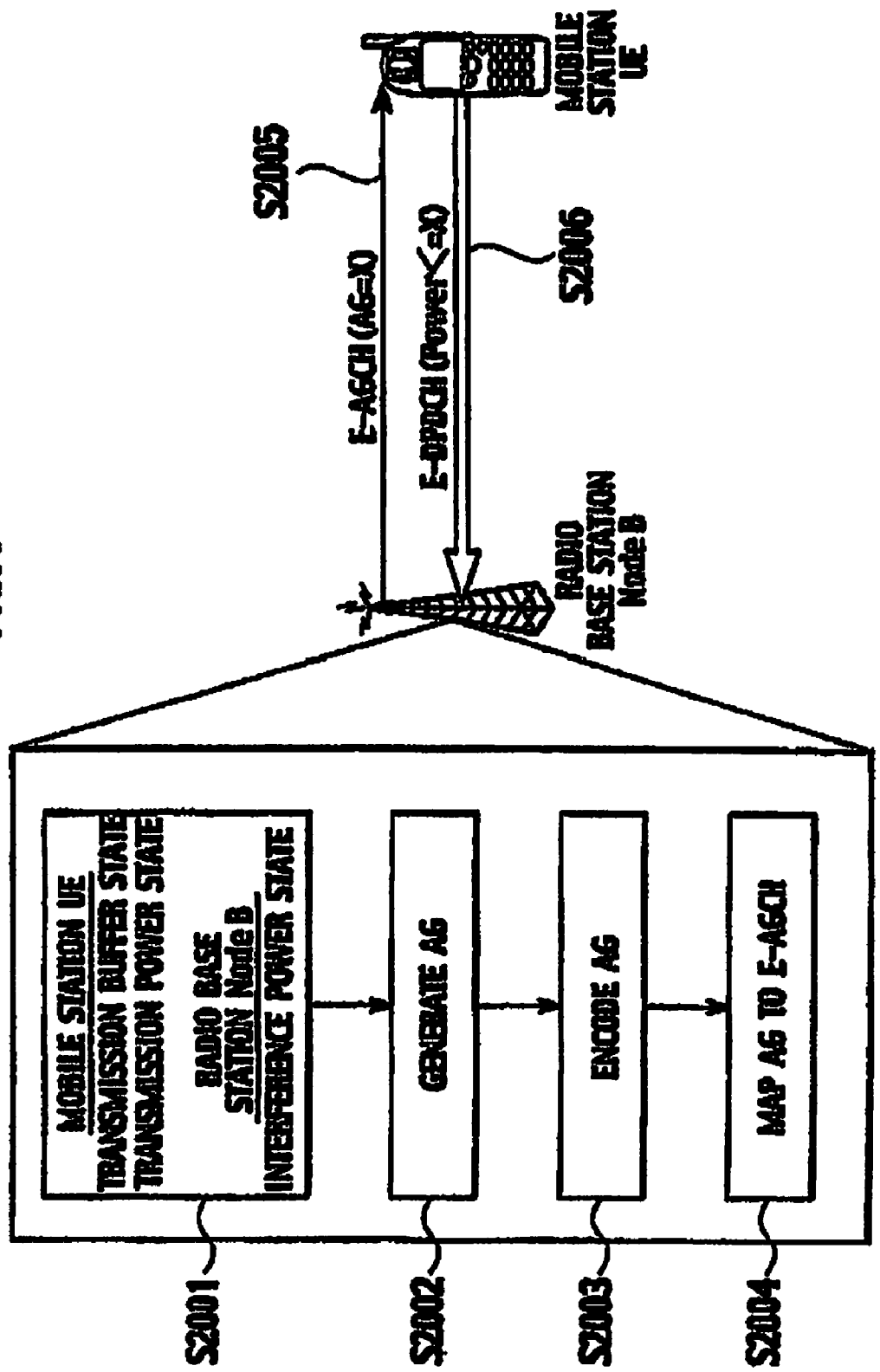

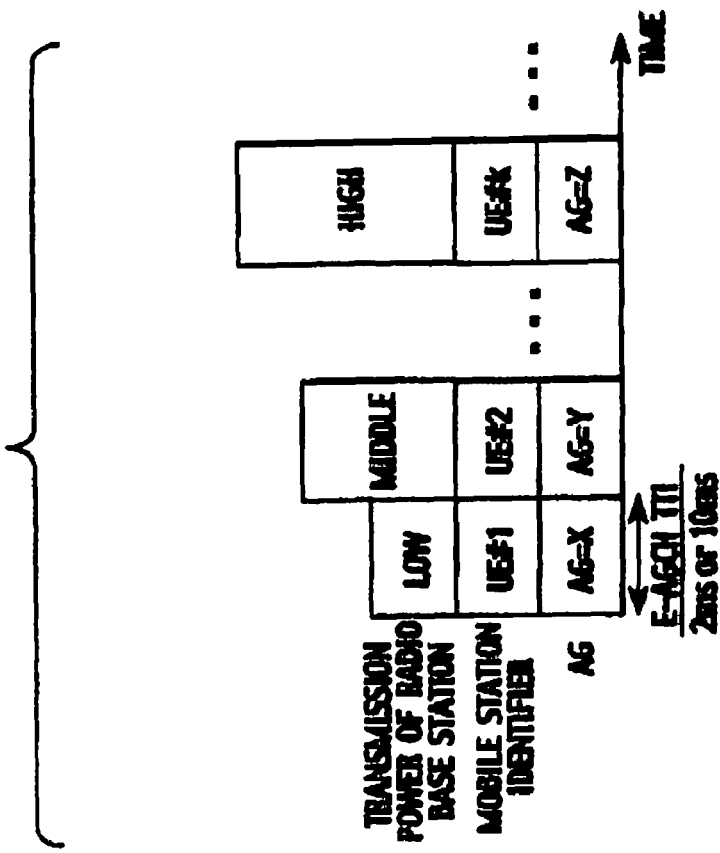
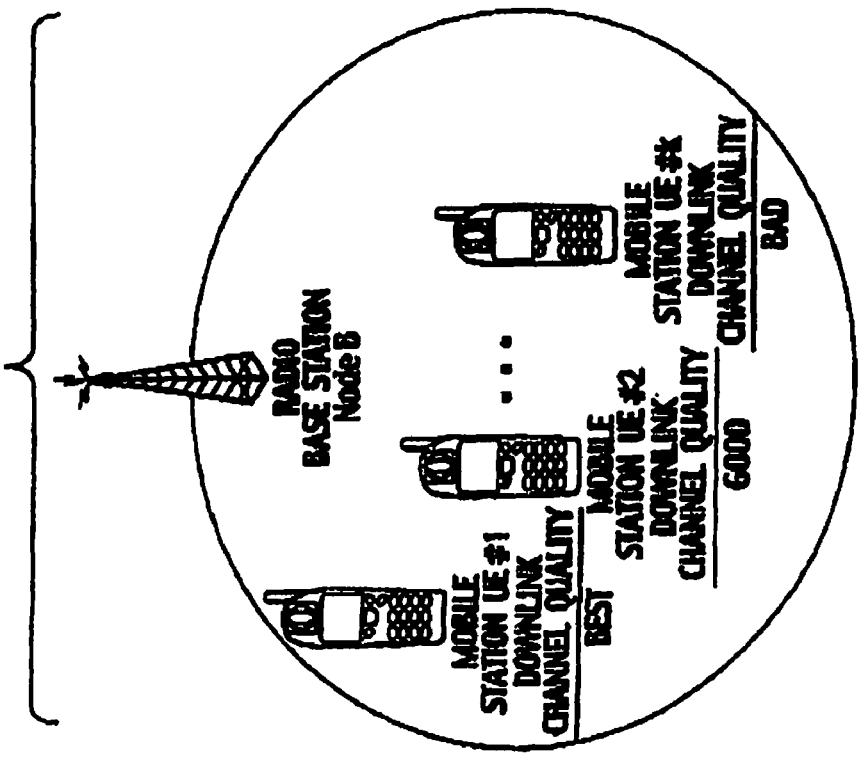
FIG.5B
FIG.5A
Prior Art

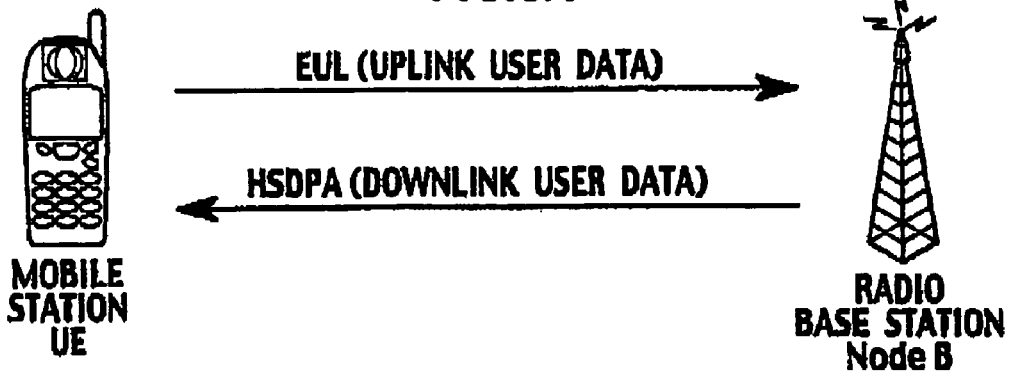
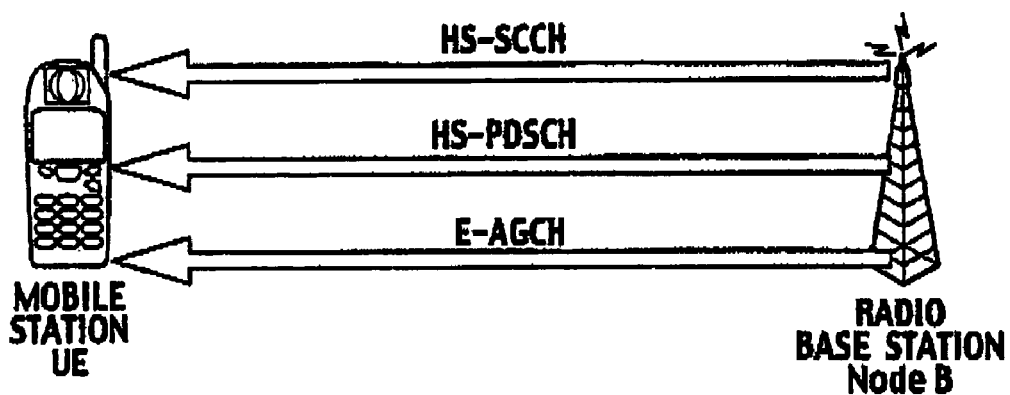
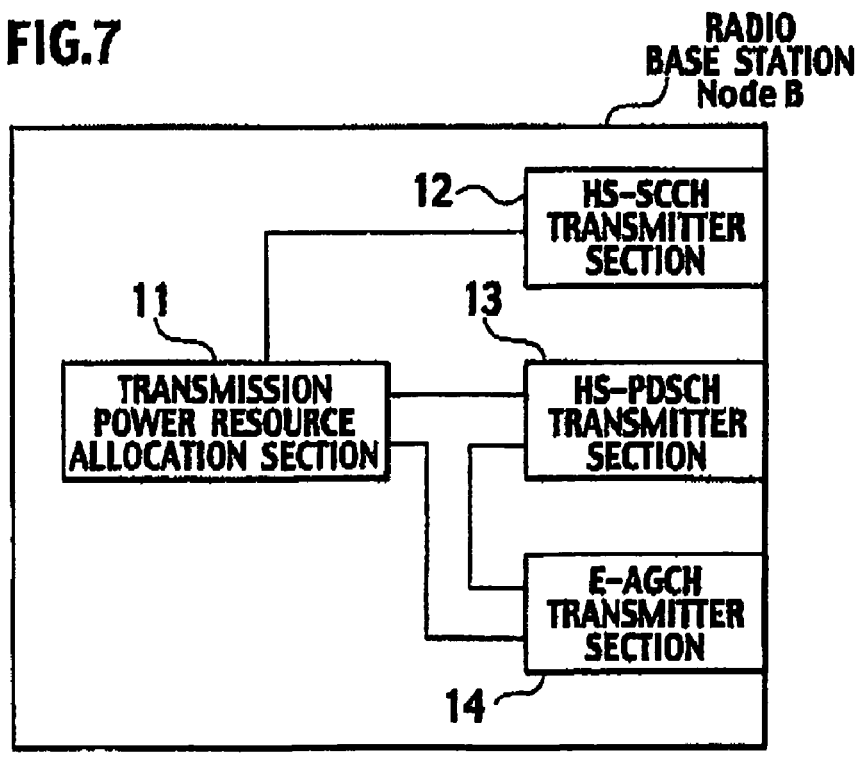

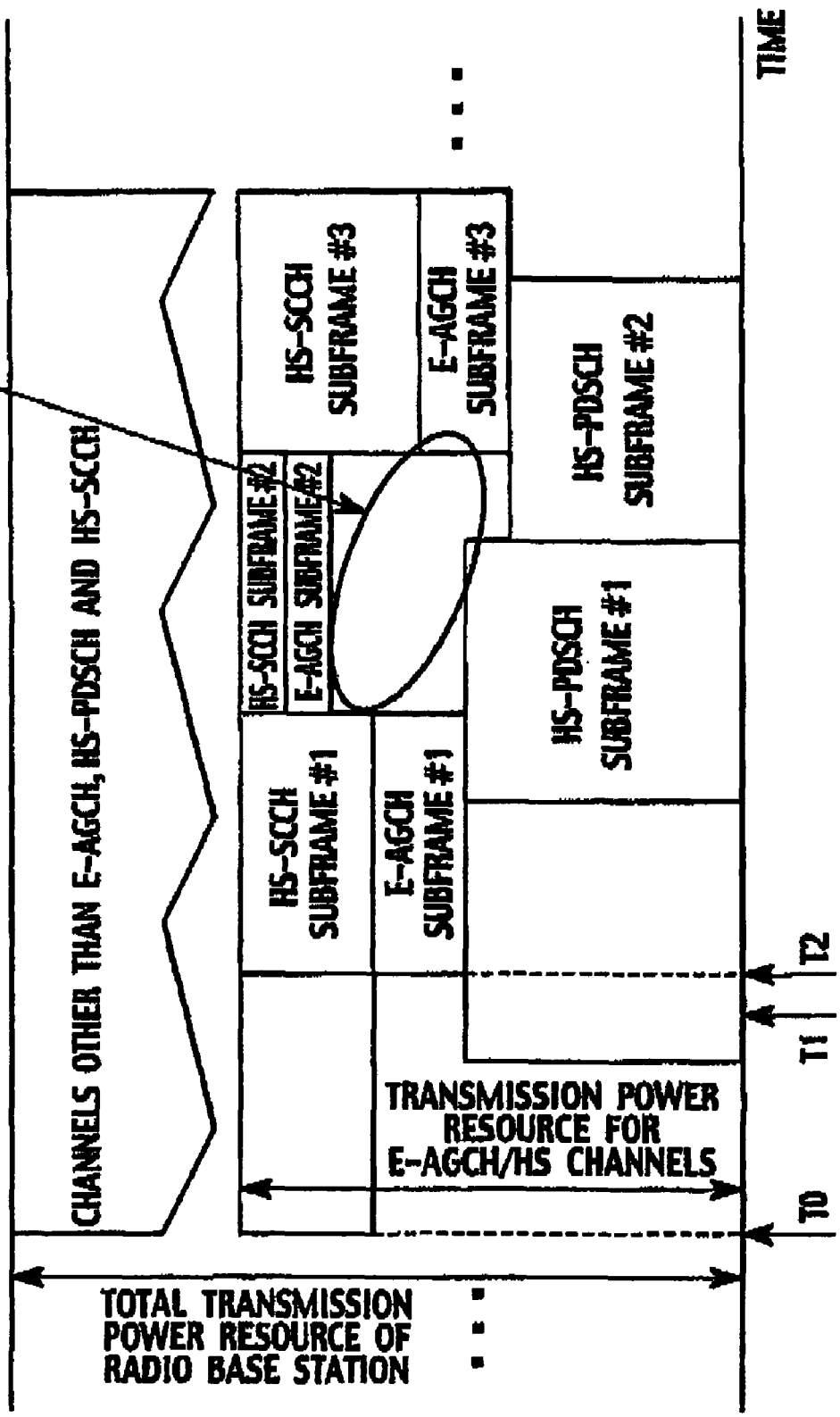

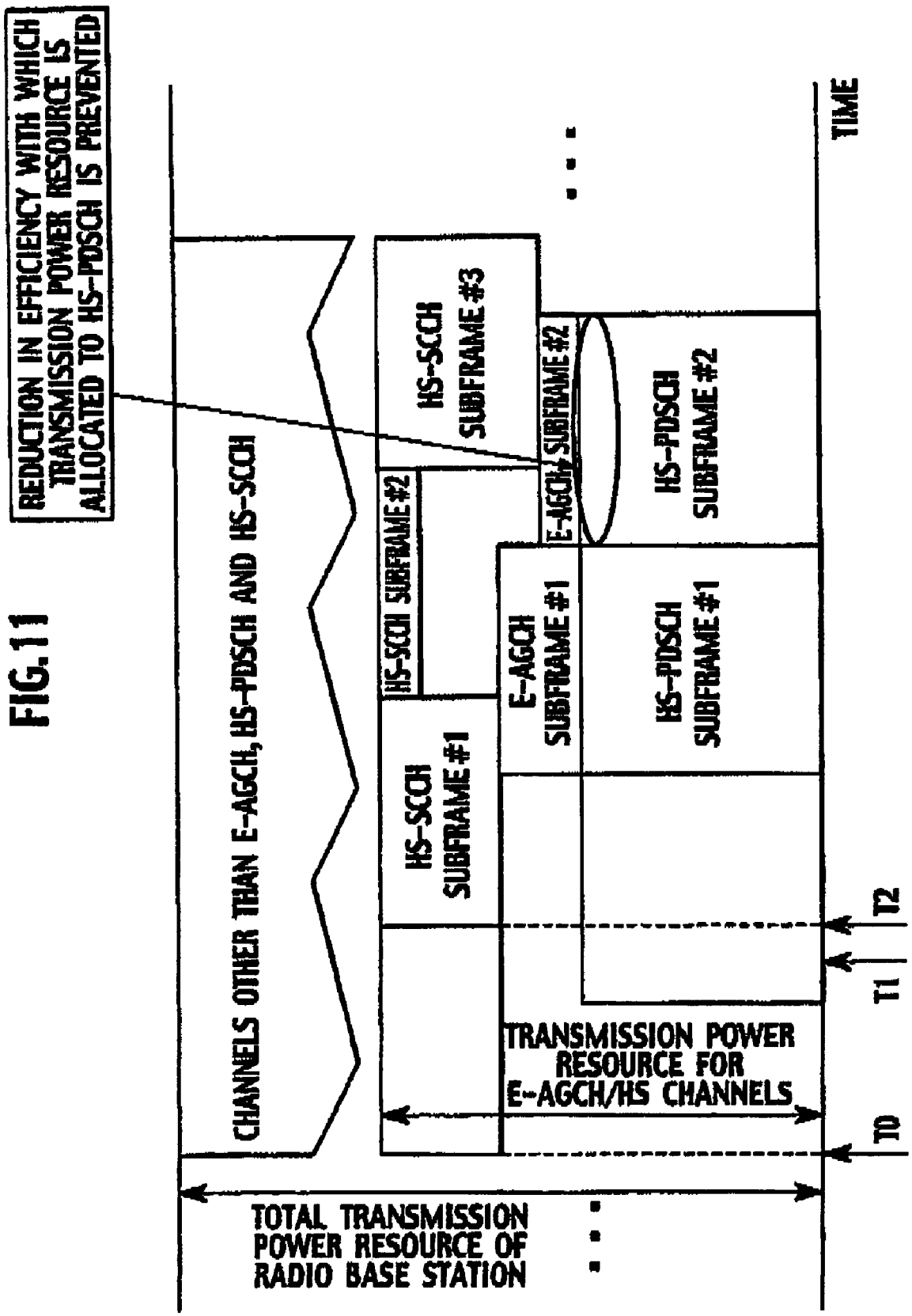

Ｕ Ｓ ７，９４１，１６８ Ｂ２

MOBILE COMMUNICATION SYSTEM, RADIO BASE STATION, MOBILE STATION AND MOBILE COMMUNICATION METHOD TO CONTROL UPLINK AND DOWNLINK CHANNEL FOR SYNCHRONIZATION

CROSS REFERENCE To RELATED APPLICATION

This application is based upon and claims the benefit of priority from the prior Japanese Patent Application No. P2005-027102, filed on Feb. 2, 2005; the entire contents of which are incorporated herein by reference.

BACKGROUND OF THE INVENTION

1. Field of the Invention

The present invention relates to a mobile communication system and a mobile communication method which control a transmission rate of user data to be transmitted from a mobile station to a radio base station via an uplink transmission rate allocation shared physical control channel, and transmit user data from the radio base station to the mobile station via a downlink shared physical data channel, and relates to a radio base station and a mobile station used in such a mobile communication system.

2. Description of the Related Art

By "3GPP" which is an international standardization organization for the third generation mobile communication system, high-speed radio-resource controlling methods used in the layer 1 and the MAC sublayer between a radio base station Node B and a mobile station UE have already been specified in order to effectively use the downlink radio resource. Such functions are collectively called the "HSDPA (High Speed Downlink Packet Access)".

In HSDPA, the "HS-PDSCH (High Speed Physical Downlink Shared Channel)" is used as a physical data channel.

The HS-PDSCH is a shared channel. During a certain HS-PDSCH subframe, downlink user data is transmitted only to a certain mobile station.

Here, the length of an HS-PDSCH subframe is 2 ms (three slots). As shown in FIG. 1, the mobile station to which downlink user data is transmitted via the HS-PDSCH can be changed every 2 ms.

The AMC (Adaptive Modulation and Coding) is applied to the user data to be transmitted via the HS-PDSCH. The TBS (Transport Block Size) of such user data is adaptively changed in accordance with the downlink channel quality of the mobile station UE and the available transmission power resource of the radio base station Node B. Here, the TBS means the amount of the user data transmitted by an HS-PDSCH subframe.

Specifically, as shown in FIG. 1, the HSDPA is configured so that the better the downlink channel quality of the mobile station UE is, or the larger the available transmission power resource of the radio base station Node B is, the larger the TBS of the user data to be transmitted via the HS-PDSCH becomes, and the higher the transmission rate of the user data to be transmitted via the HS-PDSCH becomes.

In addition, in the HSDPA, the "HS-SCCH (High Speed Shared Control Channel)" is used as a physical control channel.

Control information, such as mobile station identifiers (UE-IDs) and TBSs, which is necessary for mobile stations UE to correctly receive the HS-PDSCH, is transmitted via the HS-SCCH.

While the length of an HS-SCCH subframe is 2 ms, which is equal to the length of an HS-PDSCH subframe, the HS-SCCH subframe is transmitted at the frame timing two slots earlier than that of the HS-PDSCH subframe.

Accordingly, as shown in FIG. 1, since the mobile station identifier is mapped to the first slot of the HS-SCCH subframe, the mobile station UE can avoid receiving the HS-PDSCH subframe assigned to another mobile station DE.

By shifting the transmission frame timing of the HS-SCCH and that of the HS-PDSCH from each other in this way, a mobile station UE has no longer need to receive the HS-PDSCH subframe assigned to another mobile station UE.

On the other hand, however, the shifting of the transmission frame timing of the HS-SCCH and that of the HS-PDSCH from each other has caused a problem that the transmission power resource of the radio base station Node B cannot be fully allocated to the HS-PDSCH.

With reference to FIG. 2, such a problem will be explained in detail.

First, the radio base station Node B determines the transmission power resource allocated to the HS channels (the HS-PDSCH and the HS-SCCH).

In such allocation of the transmission power resource, appropriate transmission power resource is allocated to non-HS channels (the channels other than the HS-PDSCH and the HS-SCCH) on the basis of the past activity of the non-HS channels.

In general, the transmission power resource allocated to the HS channels is renewed every 10 to 100 ms.

Second, the radio base station Node B determines the transmission power resource allocated to the HS-SCCH.

Since the required quality (the required BLER) and the transmission rate of the HS-SCCH are constant, the transmission power resource allocated to an HS-SCCH is uniquely determined by the downlink channel quality of the mobile station UE to which the HS-PDSCH subframe corresponding to this HS-SCCH subframe is allocated.

If the HS-PDSCH is allocated to a different mobile station UE for each subframe, the power allocated to the HS-SCCH is also different for each subframe.

Third, the radio base station Node B determines the transmission power resource allocated to the HS-PDSCH.

The transmission power resource allocated to the HS-PDSCH is determined by subtracting the transmission power resource allocated to the HS-SCCH from the transmission power resource allocated to the HS channels.

At this time, the HS-SCCH subframes to be taken into consideration are the HS-SCCH subframe requiring larger transmission power resource, among the HS-SCCH subframe corresponding to the relevant HS-PDSCH subframe and the HS-SCCH subframe corresponding to the next HS-PDSCH subframe.

This is because, since the transmission frame timing of the HS-SCCH is two slots earlier than the transmission frame timing of the HS-PDSCH, the transmission frame timing of a certain HS-PDSCH subframe overlaps the transmission frame timing of the HS-SCCH subframe corresponding to the certain HS-PDSCH subframe and the transmission frame timing of the HS-SCCH subframe corresponding to the next HS-PDSCH subframe.

In FIG. 2, shown is a flow of the allocation of transmission power resource in the radio base station Node B.

The radio base station Node B allocates the transmission power resource to the HS channels at T0.

The radio base station Node B then starts to transmit the HS-SCCH subframe #1 at T2. The radio base station Node B has to transmit the TBS of the HS-PDSCH subframe #1 by the use of the HS-SCCH subframe #1. In other words, it is necessary that the transmission power resource to be allocated to the HS-PDSCH subframe #1 has already been determined at T1.

In addition, in order to determine the transmission power resource to be allocated to the HS-PDSCH subframe #1, it is necessary that the transmission power resource to be allocated to the HS-SCCH subframe #2 has already been determined. In other words, it is necessary that which mobile station UE the HS-SCCH subframe #2 is assigned to has already been determined.

For example, the radio base station Node B is required to have already scheduled, by T1, which mobile station UE the HS-SCCH subframe #2 is allocated to.

Since the transmission power resource to be allocated to the HS-SCCH subframe #1 is higher than the transmission power resource to be allocated to the HS-SCCH subframe #2, the radio base station Node B sets the transmission power resource to be allocated to the HS-PDSCH subframe #1 equal to that obtained by subtracting the transmission power resource allocated to the HS-SCCH subframe #1 from the transmission power resource allocated to the HS channels at T0.

In this case, also as shown in FIG. 2, although, during the first slot of the HS-PDSCH subframe #1, the transmission power resource allocated to the HS-channels is used without wasting the resource, during the second and third slots of the HS-PDSCH subframe #1, the transmission power resource is not fully allocated to the HS-PDSCH channel because the transmission power resource allocated to the HS-SCCH subframe #2 is significantly less than the transmission power resource allocated to the HS-SCCH subframe #1.

As described above, with regard to the conventional HSDPA, there has been a problem that there is a possibility that the transmission power resource allocated to the HS channels cannot be fully used because the transmission frame timing of the HS-SCCH and that of the RS-PDSCH are not synchronized.

By "3GPP", high-speed radio-resource controlling methods used in the layer 1 and the MAC sublayer between the radio base station Node B and the mobile station UE have been studied in order to effectively use the uplink radio resource. Such studies or functions are hereinafter collectively called the "EUL (Enhanced Uplink)".

With reference to FIGS. 3 to 5, shown is a part of content determined as a result of the studies of the EUL in the "3GPP".

With reference to FIG. 3, a description will be given of the operation that a mobile station US transmits user data to a radio base station Node B in the EUL.

In steps S1001 and S1002, the uplink user data to be transmitted to the radio base station Node B is mapped to the E-DCH (Enhanced Dedicated Channel).

Here, the E-DCH is a transport channel, and the "QoS (Quality of Service) control" for the user data in the wireless section is performed on a transport-channel basis. Specifically, the QoS of the uplink user data is set through the encoding process, the retransmission control process and the like applied to the transport channel.

The mobile station UE encodes the uplink user data mapped to the E-DCH in a step S1003, maps the encoded uplink user data to the E-DPDCH (Enhanced Dedicated Physical Data Channel) in a step S1004, and transmits the uplink user data, which has been mapped to the E-DPDCH, to the radio base station Node B.

Here, the E-DPDCH is a physical channel, and the transmission method in the wireless section is determined in accordance with the physical channel. Specifically, the modulation method, the spreading ratio, the orthogonalization code and the like are determined in accordance with the type of the physical channel.

Next, with reference to FIG. 4, a description will be given of the operation that the radio base station Node B controls the transmission power of the E-DCH (E-DPDCH) transmitted by the mobile station UE.

In steps S2001 and S2002, the radio base station Node B generates the AG (Absolute Grant) in consideration of the transmission buffer state and the transmission power state of the mobile station UE, and the interference power state in the radio base station Node B, and the like. Here, the AG is the information concerning the absolute transmission power used for transmitting the E-DCH (E-DPDCH), which is granted to the mobile station UE by the radio base station Node B.

The radio base station Node B encodes the AG in a step S2003, maps the AG to the E-AGCH (E-DCH Absolute Grant Channel) in a step S2004, and, in a step S2005, notifies the mobile station UE of the E-AGCH to which the AG has been mapped. Here, the E-AGCH is a physical channel.

In a step S2006, the mobile station UE transmits the E-DCH (E-DPDCH) in accordance with the received AG (=X). Specifically, the mobile station UE transmits the E-DCH (E-DPDCH) within the range not exceeding the absolute transmission power used for transmitting the E-DCH (E-DPDCH), which is granted by the radio base station Node B.

As described above, the E-AGCH is a physical control channel for notifying the mobile station UE of the AG generated by the radio base station Node B, and, at the same time, is a shared channel. In other words, the E-AGCH is an uplink transmission rate allocation shared physical control channel.

As shown in FIG. 5B, the AGs for the plurality of mobile stations UE#1 to UE#k, which communicate with the radio base station Node B via the EUL, are time-multiplexed into one E-AGCH.

Specifically, the AGs for the plurality of mobile stations UE#1 to UE#k are given mobile station identifiers, and are time-multiplexed on an E-AGCH subframe basis. Here, the E-AGCH subframe is operated in 2 ms or 10 ms.

Each of the mobile stations UE#1 to UE#k always receives the E-AGCH. Each of the mobile stations UE#1 to UE#k is configured to allow the E-DCH transmission to reflect the AG, only when the mobile station identifier given to the AG relating to the received E-AGCH matches its own mobile station identifier. On the other hand, each of the mobile stations UE#1 to UE#k is configured to discard the AG, if the identifiers do not match.

The transmission power which the radio base station Node B uses for the E-AGCH is determined by the downlink channel quality of the mobile station UE to which the AG is transmitted.

Specifically, if the downlink channel quality of the mobile station UE to which the AG is notified is bad, the transmission power for the E-AGCH is set high. On the other hand, if the downlink channel quality of the mobile station UE to which the AG is notified is good, the transmission power for the E-AGCH is set low. In other words, the transmission power which the radio base station Node B expends for the S-AGCH can significantly vary for each E-AGCH subframe.

However, in the study of the EUL, the transmission frame timing of the E-AGCH has not been specified yet.

On the assumption that the EUL is applied to the uplink, and the HSDPA is applied to the downlink, when the transmission frame timing of the E-AGCH is shifted from the transmission frame timing of the HS-PDSCH as in the case of the transmission frame timing of the HS-SCCH, the problem that the transmission power resource allocated to the HS channels is not fully utilized as shown in FIG. 2 will be further broaden.

As described above, since, in the conventional HSDPA, the transmission frame timing of the HS-SCCH and that of the HS-PDSCH are not synchronized, and, in the conventional EUL, the transmission frame timing of the E-AGCH is not clearly specified, it is conceivable that the transmission frame timing of the E-AGCH and that of the HS-PDSCH are also not synchronized, and there is a problem that there is a possibility that the effective use of the transmission power resource allocated to the HS channels is further inhibited.

BRIEF SUMMARY OF THE INVENTION

Accordingly, the present invention has been made in consideration of the above points, and objects of the present invention are to provide a mobile communication system and a mobile communication method in which the transmission frame timing of the E-AGCH is specified, and the transmission power resource allocated to the HS channels can be effectively used, and to provide a radio base station and a mobile station which are used in such a mobile communication system and a mobile communication method.

A first aspect of the present invention is summarized as a mobile communication system configured to control a transmission rate of user data to be transmitted from a mobile station to a radio base station via an uplink transmission rate allocation shared physical control channel, and to transmit user data from the radio base station to the mobile station via a downlink shared physical data channel; wherein transmission frame timing of the uplink transmission rate allocation shared physical control channel is synchronized with transmission frame timing of the downlink shared physical data channel.

A second aspect of the present invention is summarized as a radio base station used in a mobile communication system configured to control a transmission rate of user data to be transmitted from a mobile station to the radio base station via an uplink transmission rate allocation shared physical control channel, and to transmit user data from the radio base station to the mobile station via a downlink shared physical data channel; wherein the radio base station is configured to synchronize transmission frame timing of the uplink transmission rate allocation shared physical control channel with transmission frame timing of the downlink shared physical data channel.

A third aspect of the present invention is summarized as a mobile station used in a mobile communication system configured to control a transmission rate of user data to be transmitted from the mobile station to a radio base station via an uplink transmission rate allocation shared physical control channel, and to transmit user data from the radio base station to the mobile station via a downlink shared physical data channel; wherein the mobile station is configured to receive the uplink transmission rate allocation shared physical control channel and the downlink shared physical data channel on the assumption that transmission frame timing of the uplink transmission rate allocation shared physical control channel and transmission frame timing of the downlink shared physical data channel are synchronized with each other.

A fourth aspect of the present invention is summarized as a mobile communication method for controlling a transmission rate of user data to be transmitted from a mobile station to a radio base station via an uplink transmission rate allocation shared physical control channel, and for transmitting user data from the radio base station to the mobile station via a downlink shared physical data channel, including; synchronizing, at the radio base station, transmission frame timing of the uplink transmission rate allocation shared physical control channel with transmission frame timing of the downlink shared physical data channel; and receiving, at the mobile station, the uplink transmission rate allocation shared physical control channel and the downlink shared physical data channel on the assumption that transmission frame timing of the uplink transmission rate allocation shared physical control channel and transmission frame timing of the downlink shared physical data channel are synchronized with each other.

BRIEF DESCRIPTION OF THE SEVERAL VIEWS OF THE DRAWINGS

FIG. 4 is a diagram showing a manner in which the transmission power for the E-DPDCH transmitted by the mobile station is controlled in the conventional mobile communication system.

FIGS. 5A and 5B are diagrams showing a manner in which the transmission power for the E-DPDCH transmitted by the mobile station is controlled in the conventional mobile communication system.

FIGS. 6A and 6B are diagrams showing a channel structure in a mobile communication system according to an embodiment of the present invention.

FIG. 7 is a functional block diagram of a radio base station in the mobile communication system according to the embodiment of the present invention.

FIG. 10 is a diagram showing an example in which frame timing of downlink channels is adjusted in the mobile communication system according to the embodiment of the present invention.

FIG. 11 is a diagram showing an example in which frame timing of downlink channels is adjusted in the mobile communication system according to the embodiment of the present invention.

DETAILED DESCRIPTION OF THE INVENTION (Mobile Communication System According to an Embodiment of the Present Invention)

With reference to FIGS. 6A to 11, a description will be given of a mobile communication system according to an embodiment of the present invention.

As shown in FIG. 6A, in the mobile communication system according to this embodiment, the EUL is applied for the user data transmission in the uplink, and the HSDPA is applied for the user data transmission in the downlink.

Here, the uplink means a wireless communication link for transmitting signals from a mobile station UE to a radio base station Node B, and the downlink means a wireless communication link for transmitting signals from a radio base station Node B to a mobile station UE.

As shown in FIG. GB, in the mobile communication system according to this embodiment, three shared channels of the HS-SCCH and the HS-PDSCH (downlink shared physical data channel), as well as the E-AGCH (uplink transmission rate allocation shared physical control channel) are transmitted from the radio base station Node B to the mobile station UE in the downlink.

As shown in FIG. 7, the radio base station Node B according to this embodiment includes a transmission power resource allocation section 11, an HS-SCCH transmitter section 12, an HS-PDSCH transmitter section 13, and an E-AGCH transmitter section 14.

The transmission power resource allocation section 11 is configured to allocate transmission power resource to the HS-SCCH, HS-PDSCH and E-AGCH. A specific method of allocating transmission power resource will be explained with reference to FIG. 9.

Figure 9:
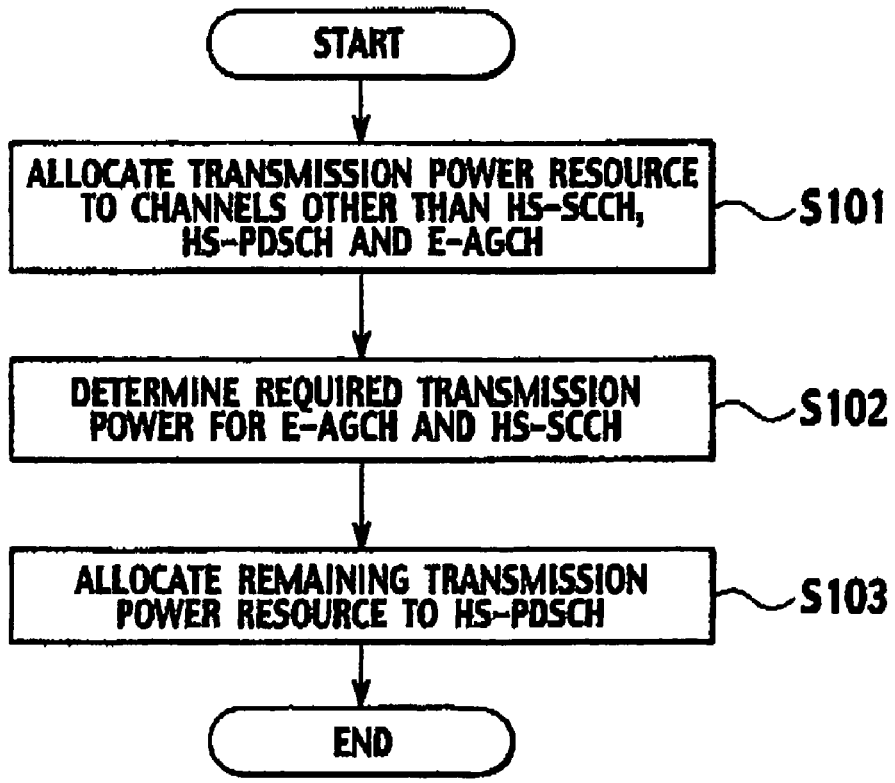
FIG. 9 is a flowchart showing an allocation operation of a transmission power resource in the mobile communication system according to the embodiment of the present invention.

As shown in FIG. 9, in a step S101, the transmission power resource allocation section 11 allocates appropriate transmission power resource including a margin to the channels other than the HS-SCCH, HS-PDSCH and E-AGCH. The transmission power resource allocation section 11 then allocates, to the HS-SCCH, HS-PDSCH and E-AGCH, the remaining transmission power resource in the total transmission power resource of the radio base station. Such allocation of transmission power resource is renewed in a cycle of 10 to 100 ms.

In a step S102, the transmission power resource allocation section 11 calculates the required transmission power for the HS-SCCH and the E-AGCH on a subframe basis to allocate transmission power resource.

In a step S103, the transmission power resource allocation section 11 allocates the remaining transmission power resource in the total transmission power resource of the radio base station to the HS-PDSCH on a subframe basis.

The HS-SCCH transmitter section 12 is configured to transmit HS-SCCH subframes at predetermined frame timing (i.e., at the timing two slots earlier than the frame timing of the HS-PDSCH) by the use of the transmission power resource allocated by the transmission power resource allocation section 11, The HS-PDSCH transmitter section 13 is configured to transmit HS-PDSCH subframes at predetermined frame timing (i.e. at the timing two slots later than the frame timing of the HS-SCCH) by the use of the transmission power resource allocated by the transmission power resource allocation section 11.

The E-AGCH transmitter section 14 is configured to transmit E-AGCH subframes at predetermined frame timing by the use of the transmission power resource allocated by the transmission power resource allocation section 11.

Specifically, the E-AGCH transmitter section 14 is configured to synchronize the transmission frame timing of the E-AGCH (the uplink transmission rate allocation shared physical control channel) with the transmission frame timing of the HS-PDSCH (the downlink shared physical data channel).

An explanation will be given below of an effect obtained by synchronizing the transmission frame timing of the E-AGCH with the transmission frame timing of the HS-PDSCH.

Figure 1:
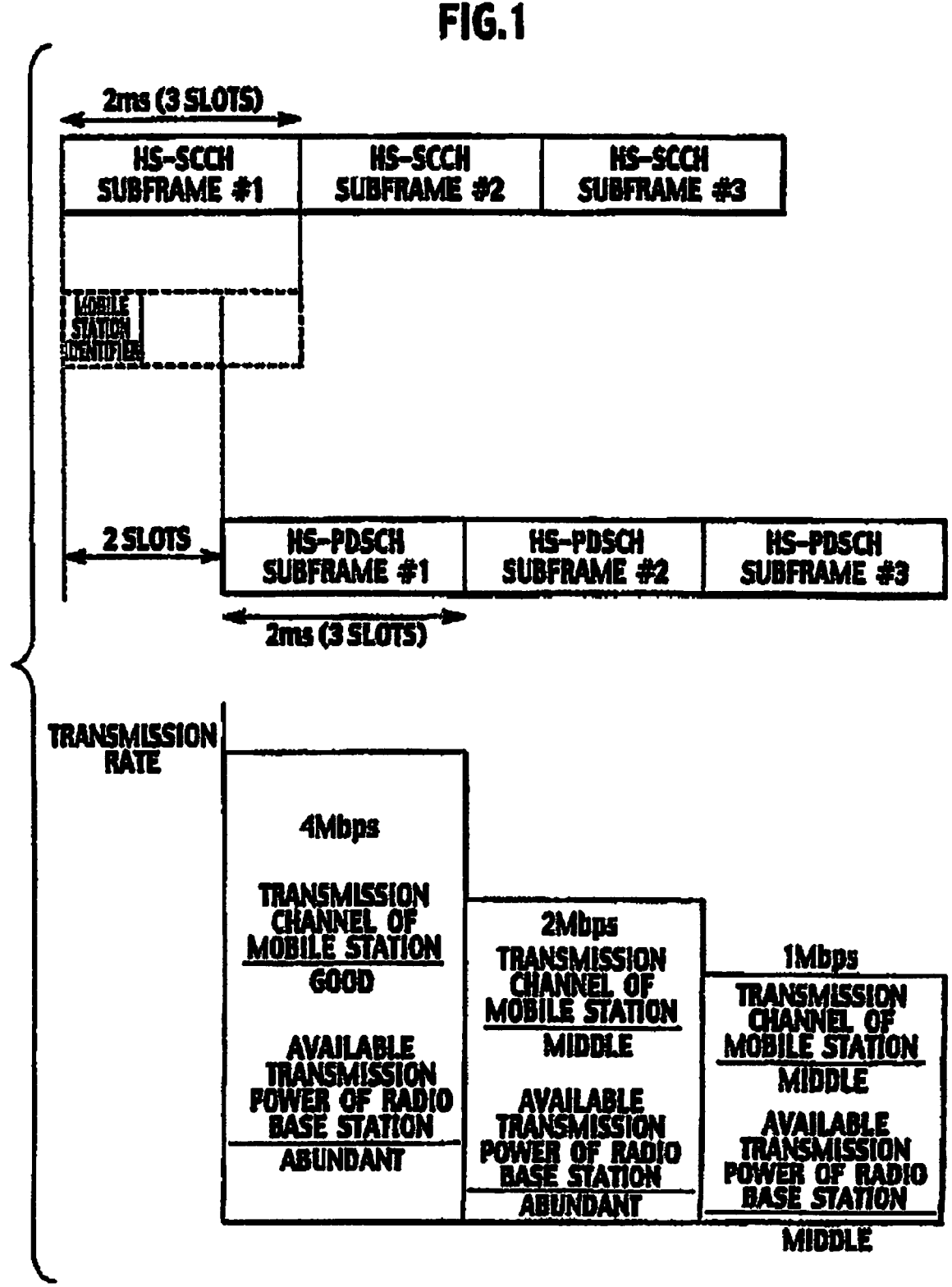
FIG. 1 is a diagram for explaining the HSDPA used in a conventional mobile communication system.
Figure 2:
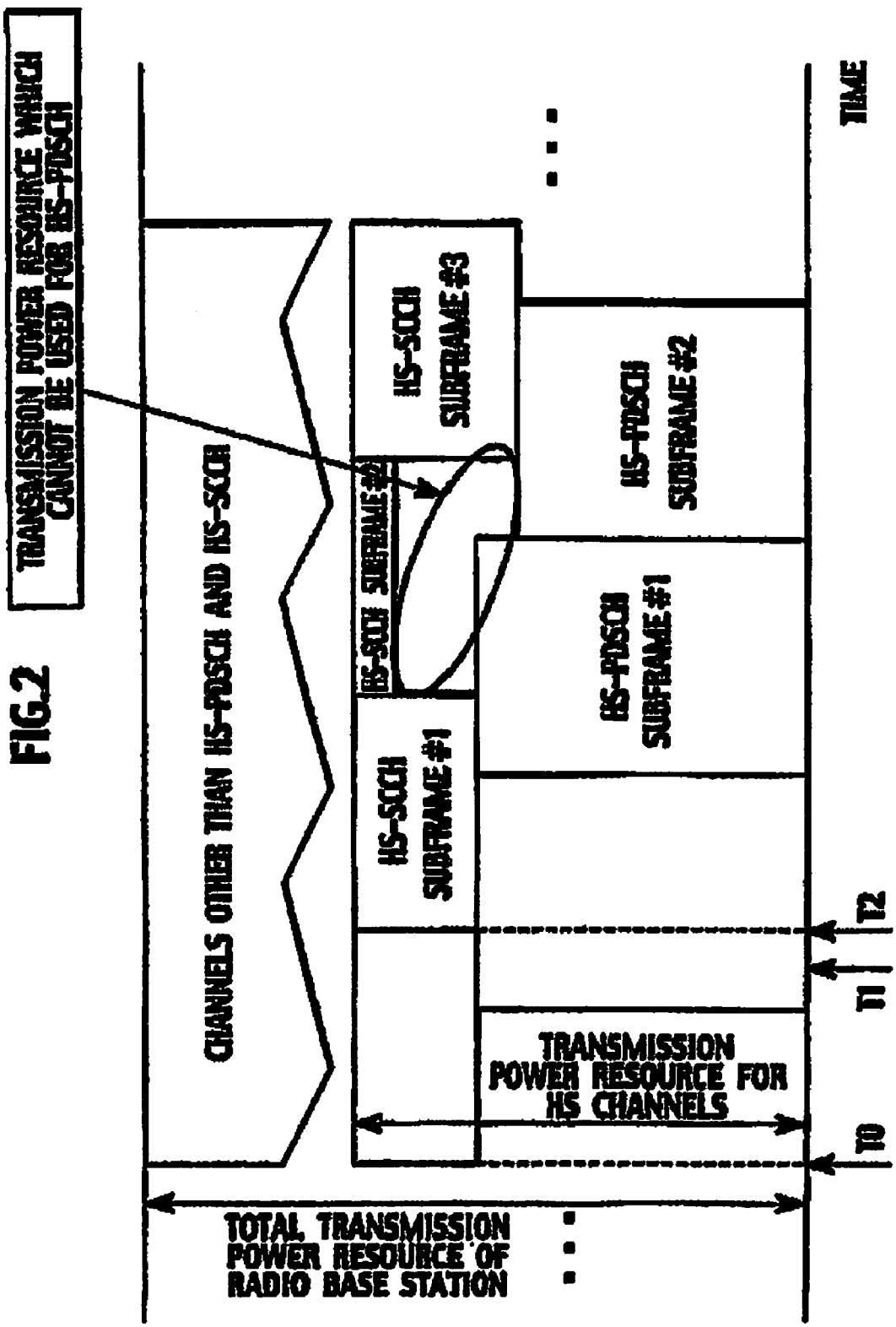
FIG. 2 is a diagram showing an example in which transmission power resource is allocated in a conventional mobile communication system.
Figure 3:
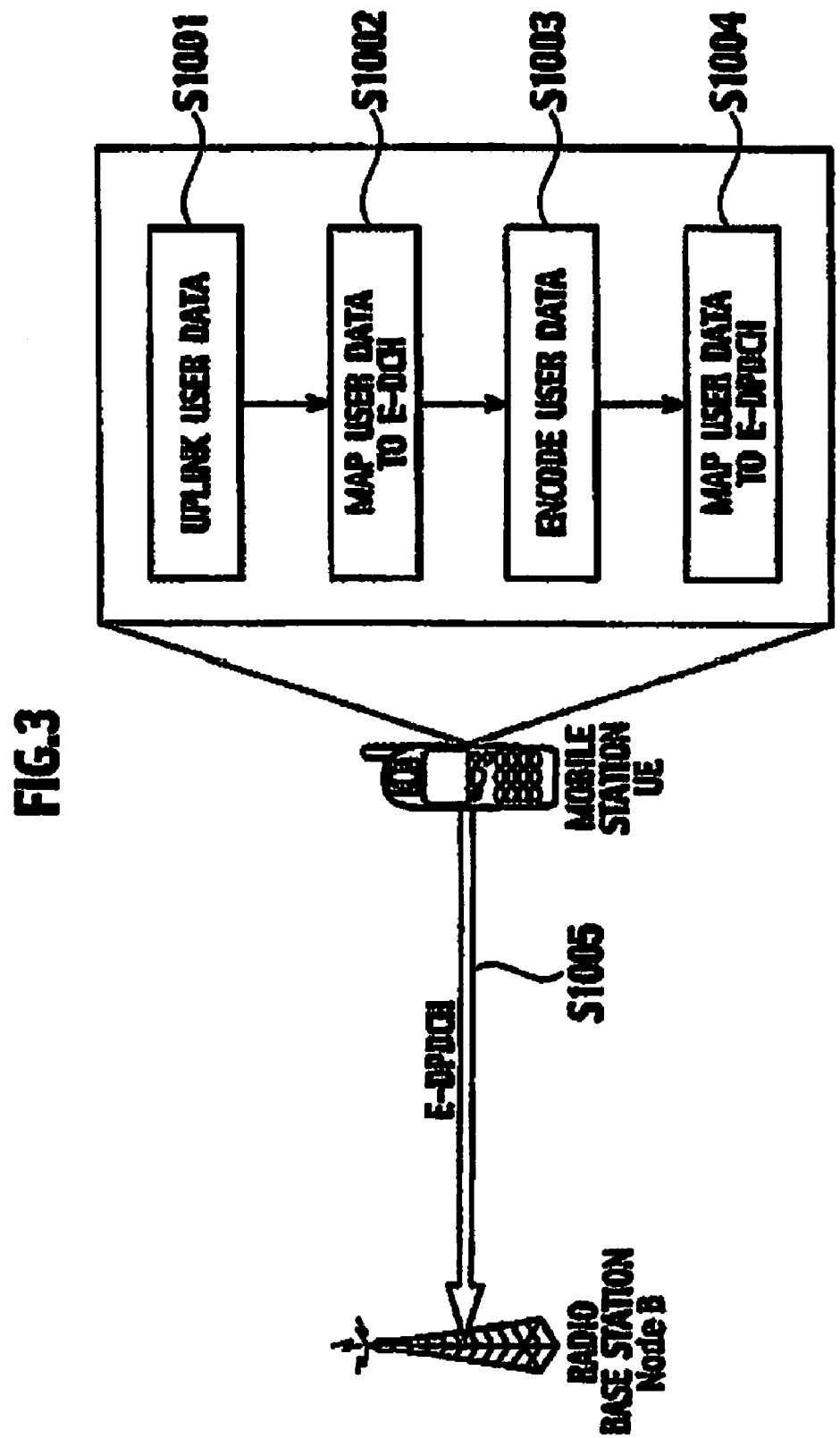
FIG. 3 is a diagram showing a manner in which a mobile station transmits an E-DPDCH to a radio base station in a conventional mobile communication system.

It has already been explained that, in the conventional HSDPA, since the transmission frame timing of the HS-SCCH and that of the HS-PDSCH are out of synchronization, the transmission power resource allocated to the HS channels cannot be fully used, with reference to FIG. 2.

With reference to FIG. 10, an explanation will now be given of the further reduction in the efficiency with which the transmission power resource is allocated to the HS-PDSCH, in the case where the transmission frame timing of the E-AGCH is synchronized with the transmission frame timing of the HS-SCCH.

The radio base station Node B allocates the transmission power resource to the HS channels and the E-AGCH at T0.

The radio base station Node B then starts to transmit an HS-SCCH subframe #1 and an E-AGCH subframe #1 at T2. The radio base station Node B has to transmit the TBS of an HS-PDSCH subframe #1 by the use of the HS-SCCH subframe #1. In other words, it is necessary that the transmission power resource to be allocated to the HS-PDSCH subframe #1 has already been determined at T1.

In addition, in order to determine the transmission power resource to be allocated to the HS-PDSCH subframe #1, it is necessary that the transmission power resource to be allocated to an HS-SCCH subframe #2 has already been determined. In other words, it is necessary that which mobile station UE the HS-SCCH subframe #2 is allocated to has already been determined.

In addition, in order to determine the transmission power resource to be allocated to the HS-PDSCH subframe #1, it is necessary that the transmission power resource to be allocated to an E-AGCH subframe #2 has already been determined. In other words, it is necessary that which mobile station UE the E-AGCH subframe #2 is allocated to has already been determined.

For example, the radio base station Node B is required to have already scheduled, by T1, which mobile station UE the HS-SCCH subframe #2 is allocated to, and which mobile station UE the E-AGCH subframe #2 is allocated to.

Since the sum of the transmission power resource to be allocated to the HS-SCCH subframe #1 and the transmission power resource to be allocated to the E-AGCH subframe #1 is higher than the sum of the transmission power resource to be allocated to the HS-SCCH subframe #2 and the transmission power resource to be allocated to the E-AGCH subframe #2, the radio base station Node B sets the transmission power resource to be allocated to the HS-PDSCH subframe #1 equal to that obtained by subtracting the transmission power resource allocated to the HS-SCCH subframe #1 and the E-AGCH subframe #1 from the transmission power resource allocated to the HS channels and the E-AGCH at T0.

In this case, also as shown in FIG. 10, although, during the first slot of the HS-PDSCH subframe #1, the transmission power resource allocated to the HS-channels and the E-AGCH is used without wasting the resource, during the second and third slots of the HS-PDSCH subframe #1, the transmission power resource is not fully allocated to the HS-PDSCH channel because the transmission power resource allocated to the HS-SCCH subframe #2 and the E-AGCH subframe #2 is significantly less than the transmission power resource allocated to the HS-SCCH subframe #1 and the E-AGCH subframe #1.

As described above, with regard to the configuration as adopted in this embodiment, the efficiency with which the transmission power resource is allocated to the HS-PDSCH becomes rather worse because, in addition to the transmission frame timing of the HS-SCCH, the transmission frame timing of the E-AGCH is different in time from the transmission frame timing of the HS-PDSCH.

A description will now be given of a principle on which the reduction in the efficiency with which the transmission power resource is allocated to the HS-PDSCH can be prevented when the transmission frame timing of the E-AGCH is synchronized with the transmission frame timing of the HS-PDSCH as in the case of the mobile communication system according to this embodiment with reference to FIG. 11.

As shown in FIG. 11, when the transmission frame timing of the E-AGCH is synchronized with the transmission frame timing of the HS-PDSCH, the following two improvements can be brought about.

First, with the mobile communication system according to this embodiment, it is possible to prevent "the further reduction in the efficiency with which the transmission power resource is allocated to the HS-PDSCH", which has been explained with the use of FIG. 10. This will be apparent with reference to the HS-PDSCH subframe #2 in FIG. 11.

While the transmission power resource allocated to the HS-PDSCH subframe #2 is limited by the required transmission power of the E-AGCH subframe #3 in the example of FIG. 10, the improvement concerning such limitation is brought about in the example of FIG. 11.

Second, with the mobile communication system according to this embodiment, by synchronizing the transmission frame timing of the E-AGCH with the transmission frame timing of the HS-PDSCH, the radio base station Node B can take more time to carry out the scheduling of the E-AGCH.

While the radio base station Node B has to determine, at T1, to which mobile station UE to allocate the E-AGCH subframe #2 in the example of FIG. 10, the radio base station Node B has only to determine, at T1, to which mobile station UE to allocate the E-AGCH subframe #1 in the example of FIG. 11.

In other words, while, in the example of FIG. 10, the radio base station Node B has to determine to which mobile station UE to allocate an E-AGCH subframe at the timing three slots and a little bit earlier than the timing when the E-AGCH subframe is transmitted, the radio base station Node B, in the example of FIG. 11, has only to determine to which mobile station UE to assign an E-AGCH subframe at the timing two slots and a little bit earlier than the timing when the E-AGCH subframe is transmitted.

For this reason, the scheduling load in the radio base station Node B can be reduced.

Figure 8:
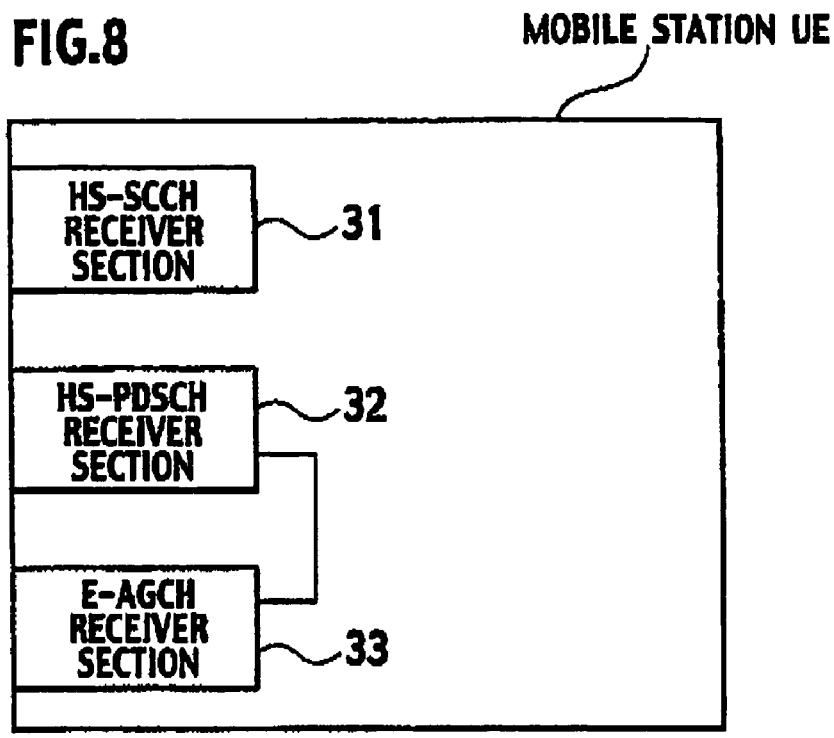
FIG. 8 is a functional block diagram of a mobile station in the mobile communication system according to the embodiment of the present invention.

As shown in FIG. 8, the mobile station UE according to this embodiment includes an HS-SCCH receiver section 31, an HS-POSCH receiver section 32, and an E-AGCH receiver section 33.

The HS-SCCH receiver section 31 is configured to receive the HS-SCCH transmitted by the radio base station Node 3 at predetermined transmission frame timing.

The HS-PDSCH receiver section 32 is configured to receive the HS-PDSCH transmitted by the radio base station Node B at predetermined transmission frame timing.

It should be noted that the HS-PDSCH receiver section 32 is configured to receive the HS-PDSCH (the downlink shared physical data channel) on the assumption that the transmission frame timing of the E-AGCH (the uplink transmission rate allocation shared physical control channel) and the transmission frame timing of the HS-PDSCH (the downlink shared physical data channel) are synchronized with each other.

The E-AGCH receiver section 33 is configured to receive the E-AGCH transmitted by the radio base station Node B at predetermined transmission frame timing.

It should be noted that the E-AGCH receiver section 33 is configured to receive the E-AGCH (the uplink transmission rate allocation shared physical control channel) on the assumption that the transmission frame timing of the E-AGCH (the uplink transmission rate allocation shared physical control channel) and the transmission frame timing of the HS-PDSCH (the downlink shared physical data channel) are synchronized with each other.

According to the present invention, it is possible to provide a mobile communication system and a mobile communication method in which the transmission frame timing of the E-AGCH is specified, and the transmission power resource allocated to the HS channels can be effectively used, and to provide a radio base station and a mobile station which are used in such a mobile communication system and a mobile communication method.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile communication system configured to control, a transmission rate of user data to be transmitted from a mobile station to a radio base station, using an uplink transmission rate allocation downlink shared physical control channel, and to transmit user data from the radio base station to the mobile station via a downlink shared physical data channel; wherein
both of a transmission frame timing of the downlink shared physical data channel and a transmission frame timing of the uplink transmission rate allocation downlink shared physical control channel are two slots later than a transmission frame timing of a high speed shared control channel.

2. A radio base station used in a mobile communication system configured to control a transmission rate of user data to be transmitted from a mobile station to the radio base station via an uplink transmission rate allocation downlink shared physical control channel, and to transmit user data from the radio base station to the mobile station via a downlink shared physical data channel; wherein
the radio base station is configured to transmit both of the downlink shared physical data channel and the uplink transmission rate allocation downlink shared physical control channel at a timing of two slots later than a transmission frame timing of a high speed shared control channel.

3. A mobile station used in a mobile communication system configured to control a transmission rate of user data to be transmitted from the mobile station to a radio base station via an uplink transmission rate allocation downlink shared physical control channel, and to transmit user data from the radio base station to the mobile station via a downlink shared physical data channel; wherein
the mobile station is configured to receive the uplink transmission rate allocation downlink shared physical control channel and the downlink shared physical data channel on the assumption that both of a transmission frame timing of the downlink shared physical data channel and a transmission frame timing of the uplink transmission rate allocation downlink shared physical control channel are two slots later than a transmission frame timing of a high speed shared control channel.

4. A mobile communication method for controlling a transmission rate of user data to be transmitted from a mobile station to a radio base station via an uplink transmission rate allocation downlink shared physical control channel, and for transmitting user data from the radio base station to the mobile station via a downlink shared physical data channel, comprising;
transmitting both of the downlink shared physical data channel and the uplink transmission rate allocation downlink shared physical control channel at a timing of two slots later than a transmission frame timing of a high speed shared control channel.

5. The mobile communication system according to claim 1, wherein the uplink transmission rate allocation downlink shared physical control channel is E-AGCH and the downlink shared physical data channel is HS-PDSCH.

6. The radio base station according to claim 2, wherein the uplink transmission rate allocation downlink shared physical control channel is E-AGCH and the downlink shared physical data channel is HS-PDSCH.

7. The mobile station according to claim 3, wherein the uplink transmission rate allocation downlink shared physical control channel is E-AGCH and the downlink shared physical data channel is HS-PDSCH.

8. The mobile communication method according to claim 4, wherein the uplink transmission rate allocation downlink shared physical control channel is E-AGCH and the downlink shared physical data channel is HS-PDSCH.

* * * * *